United States Patent
Gapes et al.

(10) Patent No.: US 6,623,641 B1
(45) Date of Patent: Sep. 23, 2003

(54) WASTEWATER TREATMENT PROCESS FOR NITROGEN-DEFICIENT FEED IN CONTROLLED ENVIRONMENT

(75) Inventors: Daniel James Gapes, Oxley (AU); Thomas Clark, Rotorua (NZ); Nicola Maree Frost, Rotorua (NZ); Alison Hyde Slade, Rotorua (NZ)

(73) Assignee: New Zealand Forest Research Institute Limited (NZ)

( * ) Notice: Subject to any disclaimer, the term of this patent is extended or adjusted under 35 U.S.C. 154(b) by 0 days.

(21) Appl. No.: 09/701,929

(22) PCT Filed: Jun. 4, 1999

(86) PCT No.: PCT/NZ99/00073

§ 371 (c)(1),
(2), (4) Date: Feb. 8, 2001

(87) PCT Pub. No.: WO99/62833

PCT Pub. Date: Dec. 9, 1999

(30) Foreign Application Priority Data

Jun. 4, 1998 (NZ) .................................................. 330578

(51) Int. Cl.$^7$ ................................................. C02F 3/02
(52) U.S. Cl. ....................................... 210/614; 210/620
(58) Field of Search ................................ 210/605, 610, 210/611, 614, 620, 631, 150, 198.1, 199, 201, 202, 220, 259, 908

(56) References Cited

U.S. PATENT DOCUMENTS

| 1,392,211 A | * | 9/1921 | Peck |
| 2,897,148 A | * | 7/1959 | Laboureur |
| 3,356,609 A | * | 12/1967 | Bruemmer |
| 3,711,392 A | * | 1/1973 | Metzger |
| 3,721,622 A | * | 3/1973 | Finn et al. |
| 3,973,043 A | * | 8/1976 | Lynn |
| 3,990,974 A | * | 11/1976 | Sullins |
| 4,056,465 A | * | 11/1977 | Spector |
| 4,138,330 A | * | 2/1979 | Garrett |
| 4,891,136 A |   | 1/1990 | Voyt |
| 5,057,213 A | * | 10/1991 | Reid et al. |
| 5,281,335 A | * | 1/1994 | Kuhn |

FOREIGN PATENT DOCUMENTS

| EP | 0 900 766 A1 | 3/1999 |
| JP | 3-169395 | 7/1991 |
| JP | 5-123694 | 5/1993 |

OTHER PUBLICATIONS

Abstract of JP 05–96296 "Biological nitrogen–deficient waste water treatment", 1993.
Abstract of JP 56–065683 "Processing waste water contg. low nitrogen content organic matter . . . ", 1981.
Abstract of JP 06–254583 "Aerobic treatment of waste water contg. no nitrogen or phosphorous . . . " 1994.
"Klebsiella and Nitrogen Fixation in Pulp and Paper Mill Effluents and Treatment Systems," Bruce & Clark, in Appita, vol 47, No. 3, 231–237, May 1994.

(List continued on next page.)

Primary Examiner—Fred Prince
(74) Attorney, Agent, or Firm—Factor & Partners

(57) ABSTRACT

This invention relates to a wastewater treatment process for treating nitrogen-deficient wastewater. The process enables the production of a low soluble nitrogen processed wastewater, and avoids the need for nitrogen supplementation in the wastewater treatment process. The process includes providing a supply of nitrogen-deficient wastewater to a controlled environment. The conditions in the controlled environment encourage the proliferation of nitrogen-fixing microorganisms in particular by control of the stability of the dissolved oxygen level. This process may be used alone or in conjunction with a conventional wastewater treatment process, relying on non-nitrogen-fixing microorganisms, without the need for nitrogen supplementation.

24 Claims, 2 Drawing Sheets

OTHER PUBLICATIONS

"Nitrogen Fixation in an Aerated Stabilisation Basin Treating Belached Kraft Mill Wastewater", Clark et al in Water Environment Research, vol. 69, No. 5, 1039–1046 Jul./Aug. 1997.

"Acetylene Reduction (Nitrogen Fixation) by Pulp and Paper Mill Effluents and by Klebsiella isolated from Effluents and by Klebsiella isolated from Effluents in Environmental situations," Knowles et al, in Applied Microbiology, vol 28, No. 4, 608–613, 1974.

"Acetylene Reduction (nitrogen fixation by Enterobacteriaceae isolated from paper mill process wastewaters," Neilson & Sparell, in Applied Microbiology, vol. 32, No. 2, 197–205, 1976.

Acetylene Reduction ($N_2$ Fixation) by Enterobacteriacaea isolated from industrial wastewaters and biological treatment systems, Neilson & Allard in Applied Microbiology and Biotechnology, vol. 23, 67–74, 1985.

* cited by examiner

WASTEWATER TREATMENT PROCESS FOR NITROGEN-DEFICIENT FEED IN CONTROLLED ENVIRONMENT

FIELD OF INVENTION

This invention relates to a wastewater treatment process, and particularly a process for treating nitrogen-deficient wastewater.

BACKGROUND

Aerobic biological processes are one of the mainstays for treatment of industrial wastewater containing organic contaminants. In such processes, bacteria consume the wastewater contaminants and are encouraged to proliferate in reactor systems under intensive aeration. These bacteria both consume the contaminants and create a sludge which ultimately must be disposed of at the end of the treatment process. Such contaminated sludge is difficult to de-water and dispose of within the local regulations governing effluent discharge. Thus, high bacterial growth, whilst it may increase contaminant consumption, also increases sludge production and, therefore, disposal costs.

A variety of process conformations, such as activated sludge moving bed biofilm reactors, aerated lagoons and aeration stabilisation basins, are used for industrial scale biological treatment. The aerated lagoons and stabilisation basins are low rate biological processing systems, whilst activated sludge and variant system's, and moving bed biofilm reactors are high rate biological processing systems.

For high rate treatment systems such as activated sludge, a biochemical oxygen demand (BOD):nitrogen ratio of 100:5 in the incoming wastewater is generally considered to be sufficient to supply the nitrogen requirements for bacterial growth. Typical BOD:nitrogen ratios for other industrial, non-nitrogen-deficient wastewaters and municipal sewage are given below (Couper and Maclennan, (1997) "Process design aspects of activated sludge for industrial wastewater treatment", *Proceedings of the* 1997 *Annual Conference of the New Zealand Water and Wastes Association*, pp 74–81; and Metcalf and Eddy (1979) "Wastewater engineering treatment disposal reuse", Tata McGraw-Hill, New Delhi).

| Typical BOD:nitrogen ratios | |
|---|---|
| Industry | BOD:N |
| Rendering | 100:10 |
| Poultry processing | 100:8 |
| Pharmaceutical | 100:11 |
| Sewage | 100:20 |

Pulp and paper mill wastewaters are typically deficient in nutrient nitrogen, which is essential to support the bacterial growth required for biological treatment of wastewaters. Conventionally, activated sludge processes used in the pulp and paper industry have been operated with the addition of nitrogen to the system, typically in the form of urea. This can be a considerable operating expense. Moreover, it can result in excessive levels of ammoniacal nitrogen in the discharge wastewater, which can become a very significant problem in the receiving water environment. A similar problem arises with a range of industrial wastewaters which are nitrogen-deficient.

A nitrogen-deficient wastewater is herein defined as a wastewater for which, due to lack of available nitrogen in the wastewater, an additional nitrogen source is required for the biological consumption of the biodegradable organic material present.

Thus, it is an object of the present invention to provide a wastewater treatment process, particularly for nitrogen-deficient wastewater, which overcomes or at least reduces the above-mentioned problems, or which at least provides the public with a useful alternative.

Other objects of the present invention may become apparent from the following description, which is given by way of example only.

STATEMENT OF INVENTION

According to one aspect of the present invention there is provided a biological wastewater treatment process wherein a controlled environment is provided for the encouragement of nitrogen-fixing microorganisms, said controlled environment provided through the supply of a nitrogen-deficient feed and maintenance of a substantialy stable dissolved oxygen level in said controlled environment.

Preferably the BOD:nitrogen ratio in the nitrogen-deficient feed may be no lower than 100:5, more preferably no lower than 100:2, and most preferably greater than 100:1.

Preferably, the process may further comprise monitoring the dissolved oxygen level in the controlled environment.

Preferably, the dissolved oxygen level may be controlled at a level which optimises organic matter removal in relation to biomass yield or settleability.

In one preferred form the process of the invention may further include transfer of the substantially nitrogen-deficient feed from a first tank or zone having a first substantially stable dissolved oxygen level to a second tank or zone having a second substantially stable dissolved oxygen level.

In one preferred process of the present invention, the substantially nitrogen-deficient feed may comprise industrial wastewater from an industry producing substantialy nitrogen-deficient wastewater.

Preferably, said process may further comprise seeding said controlled environment with nitrogen-fixing bacteria.

Preferably a biological wastewater treatment process of the invention may produce a low soluble nitrogen processed wastewater, without nitrogen supplementation.

According to a further aspect of the present invention, there is provided biological wastewater treatment apparatus including a controlled environment including nitrogen-fixing organism, means for maintaining a substantially stable dissolved oxygen level in the controlled environment, means for supplying a nitrogen-deficient wastewater to the controlled environment, and an outflow from the controlled environment.

Preferably, the controlled environment may include at least two tanks or zones, at least one having a lower substantially stable dissolved oxygen level and at least another having a higher substantially stable dissolved oxygen level.

According to a further aspect of the invention there is provided a biological wastewater treatment apparatus including:

a first controlled environment including nitrogen-fixing organisms and means for maintaining a substantially stable dissolved oxygen level, means for supplying a nitrogen-deficient wastewater to the first controlled environment, a second controlled environment including non-nitrogen-fixing organisms, means for transferring a partially-processed wastewater from the first controlled environment to the second controlled environment, and an outflow for processed wastewater from the second controlled environment.

Preferably, the process end apparatus of the invention involves a high rate biological processing system.

According to a further aspect of the present invention there is provided the biomass derived from a biological wastewater treatment process as herein described.

Other aspects of the present invention may become apparent from the following description, which is given by way of example only.

DETAILED DESCRIPTION OF THE INVENTION

Figure 1:
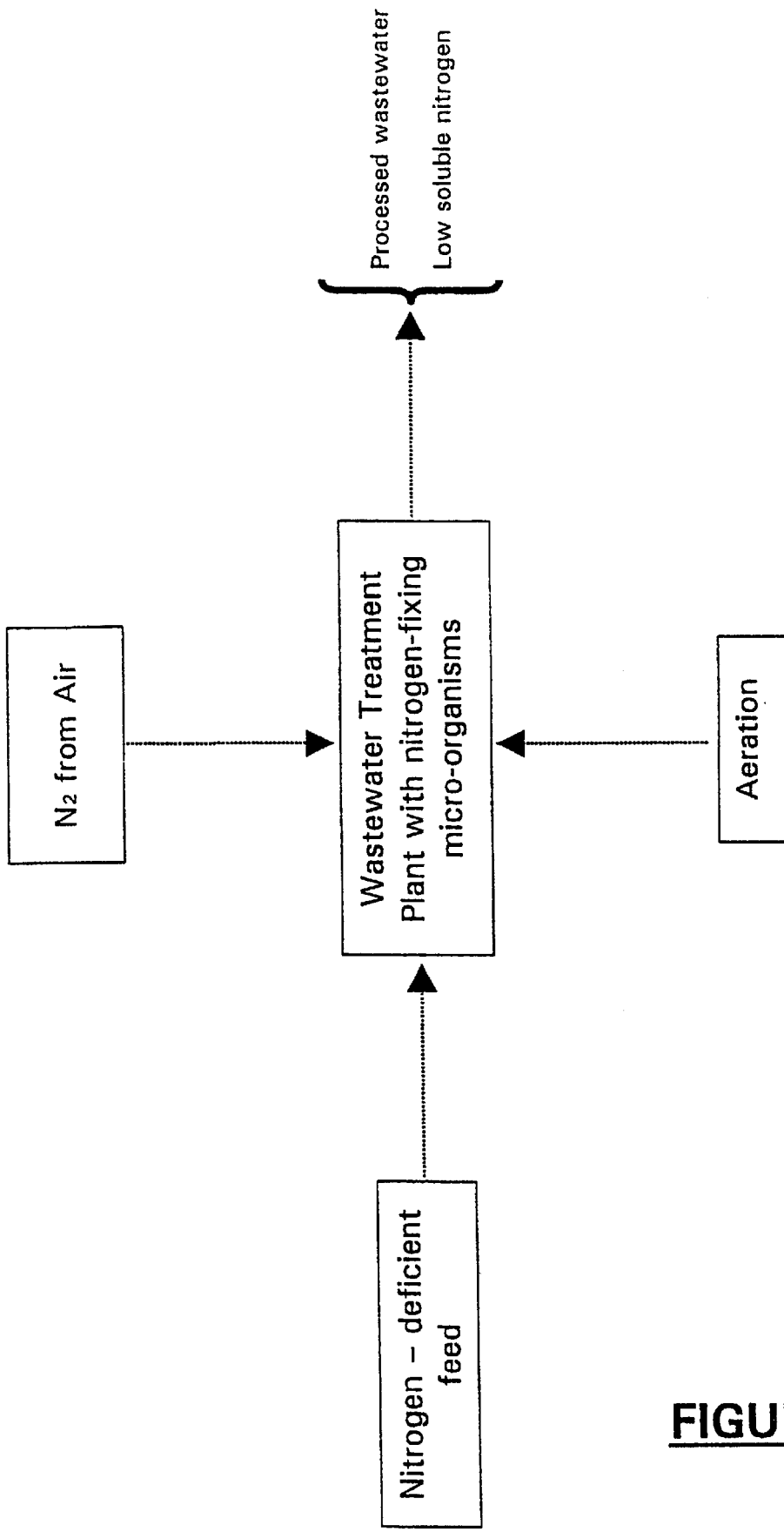
FIG. 1: shows a schematic representation of the process of the present invention in one preferred embodiment.

Research into the treatment of nitrogen-deficient, pulp and paper industry wastewater in a biological continuous stirred tank reactor (Example 1, below), revealed that bacteria can obtain sufficient nitrogen for growth by fixation of atmospheric nitrogen.

As a result of those preliminary studies, investigations were carried out to determine and optimises the environmental conditions required to maintain active nitrogen fixation, and to further investigate the commercial application of maintaining such conditions on contaminant removal, biomass yield and levels of residual soluble nitrogen in processed wastewater.

A preferred wastewater treatment process was identified in which nitrogen-deficient wastewater is supplied to a nitrogen-fixing biological system to provide an environment with a very low soluble nitrogen level (soluble nitrogen in processed wastewater <1.0 mg/L), at a normal operating pH, phosphorus level and temperature to facilitate biological growth, and with aeration control to maintain the dissolved oxygen level at a substantially stable level. The dissolved oxygen level is controlled at a level which is optimum for removal of organic matter whilst producing an acceptable biomass yield or allowing acceptable settleability. The stability of the dissolved oxygen level is of greater significance than the specific level, since changes in the level may cause inhibition of the nitrogenase enzyme responsible for nitrogen fixation in nitrogen-fixing bacteria.

This process may be carried out using an activated sludge biological treatment process, a moving bed biofilm process or other suitable biological treatment process, but has particular application for high rate systems.

With an activated sludge system, the dissolved oxygen level, coupled with organic loading, solids retention time, and food to microorganism ratio, is selected to give the best removal of organic matter (as measured by COD, BOD or TOC), with acceptable biomass characteristics (as measured by sludge volume index or biomass yield).

With a moving bed biofilm reactor or an aerated lagoon, the dissolved oxygen concentration, coupled with the organic loading rate, is selected to give the best removal of organic matter (as measured by COD, BOD or TOC) with acceptable biomass characteristics (settleability and biomass yield).

EXPERIMENTAL RESULTS

The following results were obtained using nitrogen-deficient wastewater having a BOD:nitrogen ratio in the range 100:0.4 to 100:0.8.

EXAMPLE 1

Bacterial biomass yield and removal of soluble organic material was studied in a continuous stirred tank reactor (CSTR) system without recycle. One reactor received supplementary urea and orthophosphate and was therefore a nitrogen-supplemented system. The other two reactors were operated as nitrogen-fixing systems with no nitrogen supplementation, one of the two systems receiving supplementary orthophosphate.

Dissolved oxygen concentration (2.24 mg/L), hydraulic retention time (HRT) and maintenance regime were the same in each system.

The results are shown in Table I.

The results show that addition of orthophosphate had no impact on the performance of the nitrogen-fixing system, indicating that the wastewater was not phosphorus limited.

TABLE I

| Parameter | Nitrogen-Supplemented | Nitrogen-Fixing Phosphorus addition | Nitrogen-Fixing No Phosphorus addition |
|---|---|---|---|
| HRT (d) | 0.45–0.53 | 0.51–0.52 | 0.50–0.51 |
| Dissolved oxygen level (mg/L) | 2.24 | 2.24 | 2.24 |
| Net yield (mgTSS/mg sCOD) | 0.37–0.40 | 0.20–0.32 | 0.24–0.31 |
| Feed sCOD (mg/L) | 440–460 | 440–444 | 430–440 |
| Feed sTOC (mg/L) | 145–172 | 152–156 | 153–155 |
| Feed $BOD_5$ (mg/L) | 167–192 | 191–193 | 181–186 |
| Feed TSS (mg/L) | 0* | 0* | 0* |
| Feed sTKN (mg/L) | 34–43** | 0.64–0.8 | 0.65–0.8 |
| Effl sCOD (mg/L) | 246–256 | 271–290 | 269–285 |
| % removal | 42–47 | 34–39 | 35–37 |
| Effl sTOC (mg/L) | 92–94 | 107—107 | 99–107 |
| % removal | 37–45 | 31 | 31–35 |
| Effl $BOD_5$ (mg/L) | 48–51 | 56–60 | 54 |
| % removal | 69–75 | 69–71 | 70–71 |
| Mixed liquor TSS (mg/L) | 69–90 | 35–48 | 38–48 |
| Effl TKN (mg/L) | 36–41 | 2.8–3.0 | 2.9 |
| Effl sTKN (mg/L) | 27–30 | 0.4–0.5 | 0.5 |
| N-fixation rate (mgN/mgTSS.d) | — | 0.09–0.12 | 0.09–0.11 |

*Feed was filtered prior to use in experiments.
**Such a large excess of nitrogen added to this feed would not reflect the effluent nitrogen concentrations commonly found in such systems, but highlights the difficulty with controlling supplemental nitrogen addition.

$$\text{Net yield} = \frac{TSS_{out} - TSS_{in}}{sCOD_{in} - sCOD_{out}}$$

Definitions: Feed - nitrogen-deficient wastewater; Effl - effluent or processed wastewater; HRT - hydraulic retention time; COD - chemical oxygen demand; TOC - total organic carbon; $BOD_5$ - 5-day biochemical oxygen demand; TSS - total suspended solids; TKN - total Kjeldahl nitrogen; s prefix - soluble; "in" suffix - nitrogen-deficient wastewater; "out" suffix - processed wastewater.

The nitrogen-fixing CSTR, operated at a hydraulic retention time of approximately 0.5 day, removed similar amounts of readily biodegradable material (as $BOD_5$), but slightly less chemical oxygen demand or total organic carbon, than a system operating under conditions of nitrogen supplementation.

The biomass yields in the nitrogen-fixing systems were 20–35% lower than in nitrogen-supplemented system. These lower yields for the nitrogen-fixing bacteria may be due to the greater energy requirement for fixing atmospheric dinitrogen, and the functioning of a respiratory wastage mechanism that consumes organic material in a futile process in order to protect the oxygen sensitive nitrogenase enzyme.

This example indicates the potential application of nitrogen-fixing technology to aerated lagoons (or aerated stabilisation basins), where such a system (or part of this system) could be operated under nitrogen-fixing conditions in order to provide a lower biomass yield and hence lower solids production.

The BOD of the nitrogen-deficient wastewater prior to treatment, in Example 1, was 184 mg/L. This was reduced to 54 mg/L in the nitrogen-fixing system, a reduction of about 70%. The total Kjeldahl nitrogen (TKN) content increased from 0.7 to 2.9, whilst the soluble TKN content remained low (0.5 mg/L in Table I). The BOD: nitrogen ratio of the nitrogen-deficient wastewater was 100:0.4 and this increased across the system, to 100:5.4 in the processed wastewater. It is important to note that soluble nitrogen content remained low, indicating an increase in nitrogen in the biomass.

Figure 2:
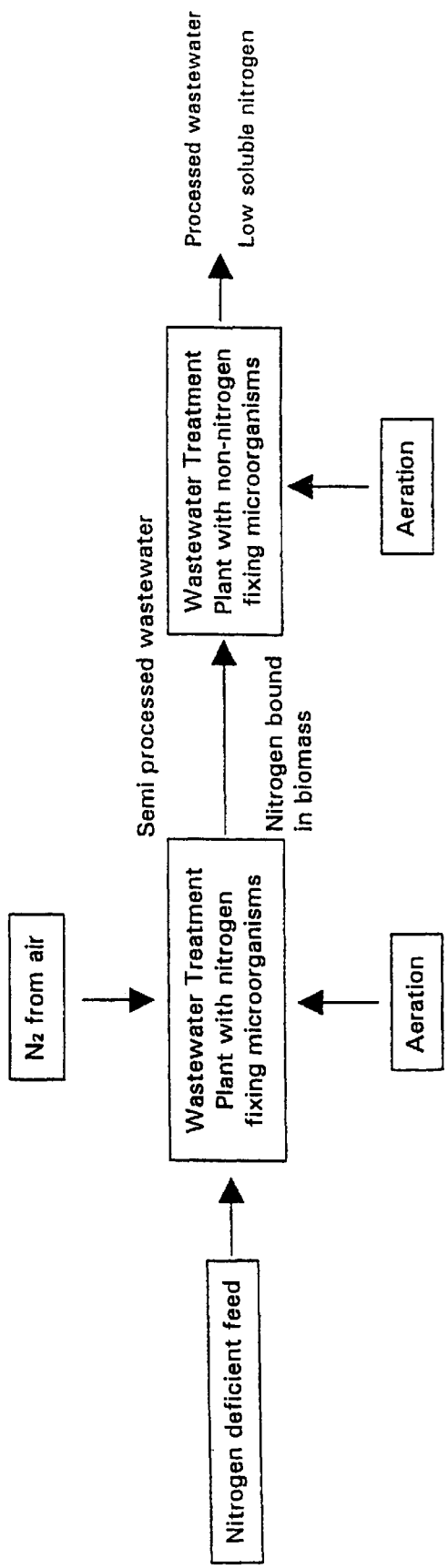
FIG. 2: shows a schematic representation of the process of the invention in an alternative embodiment involving a two stage process.

To further reduce BOD, the wastewater treatment process of the invention may be modified to include a two-stage process, as shown in FIG. 2. The first stage includes a nitrogen-fixing system capable of substantially reducing the BOD of a nitrogen-deficient wastewater, in the absence of nitrogen-supplementation. The second stage involves a conventional wastewater treatment plant into which the semi-processed wastewater from the first stage is passed for further processing. Nitrogen supplementation would not be required since the semi-processed wastewater from the first stage would include sufficient nitrogen in the biomass which would be freed from the biomass into solution by endogenous decay of biomass and/or the action of higher organisms present in the conventional non-nitrogen fixing system of the second stage. The results would be a processed wastewater with lower soluble nitrogen content than could be consistently achieved with a conventional nitrogen-supplemented wastewater treatment process.

EXAMPLE 2

A comparison was made of the effect of low and high dissolved oxygen level on nitrogen fixation in CSTR systems. The results are summarised in Table II.

TABLE II

|  | CSTR 1 | CSTR 2 |
| --- | --- | --- |
| DO level (mg/L) | 0.08 | 2.24 |
| Feed sCOD (mg/L) | 510 | 523 |
| Feed TSS (mg/L) | 0* | 0* |
| $Y_H$ (mg TSS/mg COD) | 0.38 | 0.27 |
| m (mg COD/mg TSS.d) | 0.95 | 1.22 |
| OURs at HRT = 0.3 d (mg/mg TSS.d) | 0.19–0.22 | 0.34–0.36 |

*Feed filtered prior to use.
Definitions: Feed - nitrogen-deficient wastewater; H - true growth yield; m - bacterial maintenance coefficient; OURs - specific oxygen uptake rate; DO - dissolved oxygen; sCOD - soluble chemical oxygen demand; HRT - hydraulic retention time.

The biomass yield of CSTR2 (higher dissolved oxygen) was approximately 29% lower than that of CSTR1 (lower dissolved oxygen), while the maintenance coefficient was approximately 28% higher. Measurement of the specific oxygen uptake rate of the two reactors at various hydraulic retention times showed that CSTR2 had a consistently higher specific respiration rate.

These results give evidence of an oxygen wastage effect, acting to protect the nitrogenase enzyme from higher dissolved oxygen levels. The lower yield at higher dissolved oxygen levels gives an indication of the potential to use nitrogen-fixing systems at elevated dissolved oxygen levels for decreased biomass production in systems such as aerated lagoons (or aerated stabilisation basins).

EXAMPLE 3

The application of nitrogen fixation to activated sludge and moving bed biofilm systems was investigated.

Results were obtained under four different conditions of reactor operation as shown in Table III:

TABLE III

| Reactor No. | Reactor Type | Nitrogen Supple-mentation? | Nitrogen Fixation Occurring? | Dissolved Oxygen Level (mg/L) |
| --- | --- | --- | --- | --- |
| R1 | Activated Sludge | No | Yes | 2.3 |
| R2 | Activated Sludge | No | Yes | 0.4 |
| R3 | Moving Bed Biofilm | No | Yes | 2.3 |
| R4 | Activated Sludge | Yes | No | 2.3 |

Nitrogen, in the form of ammonium chloride, and phosphorus, in the form of sodium dihydrogen orthophosphate, were used for nutrient supplementation. In the R4 reactor (nitrogen-supplemented) a COD:N:P ratio of 200:5:0.5 was targeted. In the nitrogen-fixing systems a phosphorus stock feed was used, targeting a COD:P ratio of 200:0.5.

Further details of the full specifications for each reactor and the results are shown in Table IV:

TABLE IV

| SPECIFICATIONS | R1 | R2 | R3 | R4 |
| --- | --- | --- | --- | --- |
| Feed Rate (L/d) | 4.2 | 4.1 | 4.0 | 3.9 |
| Operational Volume (L) | 1.99 | 1.91 | 1.92 | 1.91 |
| HRT (d) | 0.47 | 0.47 | 0.49 | 0.49 |
| SRT (d) | 8.3 | 8.4 | — | 8.2 |
| Feed pH | 7.9 | 7.9 | 7.9 | 7.9 |
| Effluent pH | 8.1 | 8.1 | 8.1 | 7.9 |
| Feed tCOD (mg/L) | 529 | 529 | 529 | 515 |
| Feed sCOD (mg/L) | 473 | 473 | 473 | 457 |
| Feed $BOD_5$ (mg/L) | 183 | 183 | 183 | 162 |
| Feed TSS (mg/L) | 45 | 45 | 45 | 32 |
| Feed VSS (mg/L) | 34 | 34 | 34 | 26 |
| Feed TKN (mg/L) | 1.37 | 1.37 | 1.37 | 21 |
| F:M Ratio |  |  |  |  |
| (g sCOD/gVSS · d) | 0.84 | 0.88 |  | 0.75 |
| (g$BOD_5$/gVSS · d) | 0.31 | 0.33 |  | 0.26 |
| Net Specific Growth Rate ($\mu$) | 0.086 | 0.085 |  | 0.088 |
| (g VSS/g VSS · d) |  |  |  |  |
| Organic Load (kg/m³ · d) |  |  |  |  |
| tCOD | 1.12 | 1.13 | 1.09 | 1.06 |
| sCOD | 1.00 | 1.01 | 0.98 | 0.94 |
| sTOC | 0.37 | 0.37 | 0.36 | 0.34 |
| $BOD_5$ | 0.39 | 0.39 | 0.37 | 0.33 |

TABLE IV-continued

| SPECIFICATIONS | R1 | R2 | R3 | R4 |
|---|---|---|---|---|
| Mean Removal (%) | | | | |
| tCOD | 58 | 62 | 46 (55*) | 67 |
| sCOD | 57 | 60 | 55 | 65 |
| sTOC | 54 | 57 | 54 | 65 |
| $BOD_5$ | 95 | 97 | 91 | 97 |
| Colour | 14 | 12 | 9 | 21 |
| Methanol/Ethanol Removal (%) | >96 | >96 | >96 | >96 |
| Total Wood Extractives Removal (%) | >95 | >95 | >95 | >95 |
| Biomass Yield (mg VSS/mg COD) | | | | |
| Net | 0.17 | 0.16 | 0.12 (0.088**) | 0.18 |
| Apparent | 0.22 | 0.20 | 0.17 (0.14**) | 0.22 |
| Soluble nitrogen in effluent (mg/L) | 0.5–0.7 | 0.66–0.71 | 0.67–0.89 | 2.1–4.4 |

*Calculated on R3 effluent settled supernatant.
**Calculated excluding one outlier datapoint.

$$\text{Net Yield} = \frac{VSSout - VSSin}{sCODin - sCODout}$$

$$\text{Apparent Yield} = \frac{VSSout}{tCODin - sCODout}$$

Definitions:
Feed - nitrogen deficient wastewater; Effluent - processed wastewater; COD - Chemical Oxygen Demand; TOC - Total Organic Carbon; $BOD_5$ - 5-day Biochemical Oxygen Demand; VSS - Volatile Suspended Solids; t prefix - total; s prefix - soluble; suffix "in" - feed stream to reactor; and suffix "out" - effluent stream from reactor; F:M Ratio - Food:Microorganism Ratio.

The results show that under conditions of nitrogen-deficient wastewater and constant dissolved oxygen level, fixation of nitrogen from the atmosphere can occur effectively under both activated sludge and moving bed biofilm treatment configurations.

There was excellent bulk organics removal in all four systems, as well as excellent removal of trace organics. The processed wastewater from the nitrogen-fixing systems had extremely low soluble nitrogen contents. In contrast, the soluble nitrogen content of the processed wastewater in a non-nitrogen deficient environment, where nitrogen-fixation was not occurring, was several times higher.

Reduction of COD and removal of TOC was slightly better in the nitrogen-supplemented system than in the nitrogen-fixing systems. However, the 50–70% removal of COD and sTOC, and >90% removal of $BOD_5$, with all four systems compares favourably with literature reports of bulk organics removal with activated sludge systems.

In the nitrogen-fixing activated sludge, there was slightly better treatment performance with the lower dissolved oxygen level.

The selection of dissolved oxygen level is important in that too low a level may result in the biomass being less readily settleable, whilst too high a level may result in insufficient removal of organic materials. Most importantly, for optimum activity of the nitrogen-fixing bacteria, the dissolved oxygen level should be maintained stable.

Greater than 96% removal of methanol/ethanol in each of the four systems was a further indicator of the good performance of the systems. Similarly there was >95% removal of wood extractives, including >97% reduction of terpenes and resin acids and >88% removal of phenolics, in all systems.

The biomass yield associated with nitrogen-fixing systems in activated sludge was only marginally lower than for the nitrogen-supplemented system. There was a lower biomass yield in the biofilm reactor nitrogen-fixing system although a nitrogen supplemented biofilm reactor was not trialed. All the biomass yield figures were in the range of 0.15–0.2 mg TSS/mg COD which have been recorded previously in extended aeration activated sludge systems.

EXAMPLE 4

The importance of stable operating dissolved oxygen level was demonstrated in a simple experiment. The effect of a sudden increase in dissolved oxygen level from 1% of saturation to 30% of saturation was monitored in terms of the acetylene reduction rate. The results are summarised in Table V. The reactor was operated as a CSTR at an HRT of 1.65 d, and received a nitrogen-deficient wastewater with a readily biodegradable COD of 940 mg/L.

TABLE V

| Time (hr) | Dissolved Oxygen Level (% Saturation) | Acetylene Reduction Rate (nmoles/mL.h) |
|---|---|---|
| 0 | 1 | 15.9 |
| 1 | 30 | 5.3 |
| 4 | 30 | 6.8 |
| 19.5 | 30 | 15.2 |

When the dissolved oxygen level was raised suddenly, the acetylene reduction rate decreased, returning to the original level in approximately 24 hours.

EXAMPLE 5

An experiment was carried out using CSTRs at a dissolved oxygen level of 1% of saturation to determine the effect of varying the growth rate with respect to COD removal, mixed liquor TSS concentration and the extent of nitrogen fixation. Reactor operating conditions are listed in Table VI and the results are shown in Table VII.

TABLE VI

| SPECIFICATIONS | | | | |
|---|---|---|---|---|
| Dissolved oxygen (% of saturation) | 1 | 1 | 1 | 1 |
| HBT (d) | 1.09 | 0.48 | 0.32 | 0.27 |
| Flow rate (L/d) | 4.3 | 9.76 | 14.6 | 17.7 |
| Feed sCOD (mg/L) | 514 | 532 | 533 | 534 |
| Feed TSS (mg/L)* | 0 | 0 | 0 | 0 |
| Feed sTKN (mg/L) | 1.1 | 1.4 | 1.1 | 1.1 |
| Mixed liquor TSS (mg/L) | 69 | 72 | 79 | 81 |
| Mixed liquor TKN (mg/L) | 5.0 | 6.0 | 6.2 | 6.9 |
| Mixed liquor sTKN (mg/L) | 0.5 | 0.6 | 0.6 | 0.6 |
| Effluent sCOD (mg/L) | 258 | 279 | 300 | 308 |
| Effluent TSS (mg/L) | 63 | 76 | 82 | 83 |
| Effluent TKN (mg/L) | 4.6 | 6.3 | 6.4 | 7.1 |
| Growth rate (1/d) | 0.84 | 2.18 | 3.23 | 3.85 |
| Rate of $N_2$ fixation (mgN/mg TSS.d) | 0.05 | 0.14 | 0.21 | 0.28 |

*feed filtered prior to use
Definitions: Feed - nitrogen deficient wastewater; Effluent - processed wastewater; HRT - Hydraulic Retention Times; COD - Chemical Oxygen Demand; TSS - Total Suspended Solids; TKN - Total Kjeldahl Nitrogen; s prefix - soluble.

TABLE VII

| Growth rate (1/d) | Soluble COD removed (mg/L) | TKN fixed atmospherically (mg/L) | TKN fixed per unit biomass (mg TKN/mg TSS) |
|---|---|---|---|
| 0.84 | 256 | 3.9 | 0.057 |
| 2.18 | 253 | 4.6 | 0.064 |
| 3.23 | 233 | 5.1 | 0.065 |
| 3.85 | 226 | 5.8 | 0.072 |

The results give evidence that over a range of growth rates, COD removal is not limited by nitrogen fixation. Under the conditions tested, the TKN fixed per unit biomass remained approximately the same.

Thus, under appropriate environmental conditions, nitrogen-deficient wastewater can be effectively treated in a biological treatment process without the need to provide supplementary nitrogen, and without the associated problem of higher soluble nitrogen content of the effluent.

It will be appreciated that under the conditions defined in the process of the invention, nitrogen-fixing bacteria will proliferate. However, for commercial reasons it may be preferable to seed the controlled environment with appropriate nitrogen-fixing organisms. Heterotrophic bacteria that contain members known to fix nitrogen which could be used to seed the controlled environment include:

| Aerobic | Microaerophilic | Anaerobic |
|---|---|---|
| Azotobacteraceae | Enterobacteriaceae | Bacillaceae |
| Beijerinckia spp | Methylococcaceae | Rhodospirillaceae |
| Derxia spp | Psuedomonadaceae | Vibrionaceae |
|  | Rhizobiaceae |  |
|  | Beggiatoaceae |  |
|  | Azospirillum spp |  |
|  | Xanthobacter spp |  |
|  | Mycoplana spp |  |

It will be appreciated that this list is not intended to be exhaustive and there may be other species of nitrogen-fixing organisms which may be equally or more effective in the process of the invention.

The process of the invention has been demonstrated to operate effectively in an activated sludge system, a moving bed biofilm system or an aerated lagoon-type environment. Since activated sludge and biofilm systems generally have multiple tanks or zones operating under different conditions, it is envisaged that the process of this invention may be incorporated as a part of a wastewater treatment process; one or more of those tanks or zones having an environment controlled in accordance with the process of the invention.

In a multi tank/zone system it is also envisaged that the process of the invention may operate in, for example, two separate environments each having a different but stable dissolved oxygen level. A first tank/zone having a low dissolved oxygen level would optimise organics removal, whilst a second tank/zone with a higher dissolved oxygen level would reduce biomass yield and provide for better sludge settling characteristics. Both tanks would be nitrogen-fixing environments.

In addition, the nitrogen-fixing system, whether as a single or multi-tank system, may be used in conjunction with a conventional non-nitrogen-fixing system to process nitrogen-deficient wastewater, without the need for supplementary nitrogen, to produce a processed wastewater having a low soluble nitrogen content.

Whilst the above examples were carried out employing nitrogen-deficient wastewater from the pulp and paper industry, it will be appreciated that there are many other industries which produce nitrogen-deficient wastewater, and for which the process of the present invention would be equally applicable.

Effluents from different industries have different compositions and characteristics. Different nitrogen-fixing bacteria may have particular benefits for particular effluents. Thus, it is envisaged that adjustment or tuning of the conditions of the nitrogen-fixing environment employed in the process of the invention, such as the dissolved oxygen level and possibly the pH, temperature, and other conditions, may be advantageous to encourage the proliferation of the preferred nitrogen-fixing organism for the specific effluent.

It will also be appreciated that the process of the present invention relies on proliferation of the nitrogen-fixing bacteria. For effective initiation of commercial operation, it is envisaged that biological plants carrying out the process of the present invention will preferably be seeded with nitrogen-fixing microorganisms.

Where in the foregoing description, reference has been made to specific components or integers of the invention having known equivalents, then such equivalents are herein incorporated as if individually set forth.

Although the invention has been described by way of example and with particular reference to a preferred embodiment shown in the accompanying drawing, it should be appreciated that variations and modifications may be made thereto without departing from the scope of the invention.

What is claimed is:

1. A biological wastewater treatment process wherein a controlled environment is provided for the encouragement of nitrogen-fixing organisms, said controlled environment provided through the supply of a nitrogen-deficient feeod and maintenance of a substantialy stable dissolved oxygen level in the controlled environment.

2. A biological wastewater treatment process according to claim 1 wherein the BOD:nitrogen ratio in the nitrogen-deficient feed is no lower than 100:5.

3. A biological wastewater treatment process according to claim 2 wherein the BOD:nitrogen ratio is no lower than 100:2.

4. A biological wastewater treatment process according to claim 3 wherein the BOD:nitrogen ratio is greater than 100:1.

5. A biological wastewater treatment process according to claim 1 wherein the dissolved oxygen level in the controlled environment is monitored and aeration is controlled to maintain the substantialy stable dissolved oxygen level.

6. A biological wastewater treatment process according to claim 5 wherein the dissolved oxygen level is controlled at a level which optimises organic matter removal in relation to biomass yield or settleability.

7. A biological wastewater treatment process according to claim 1 wherein the controlled environment involves a high rate biological processing system.

8. A biological wastewater treatment process according to claim 1 wherein the controlled environment is seeded with nitrogen-fixing bacteria.

9. A biological wastewater treatment process according to claim 1 wherein the controlled environment includes at least two interconnected tanks or zones, the dissolved oxygen level maintained at a lower substantially stable level in one of the tanks or zones and a higher substantially stable level in the other tank or zone, a partially-processed wastewater transferring from the fist tank or zone to the subsequent tank or zone during processing.

10. A biological wastewater treatment process according to claim 1 further including the subsequent treatment of an outflow from the controlled environment through a conventional wastewater treatment plant including non-nitrogen-fixing organisms, without nitrogen supplementation.

11. A biological wastewater treatment process according to claim 1 producing a low soluble nitrogen processed wastewater, without nitrogen supplementation.

12. Biomass derived from a biological wastewater treatment process according to claim 1.

13. A biological wastewater treatment process according to claim 1 wherein the dissolved oxygen level is maintained stable at a selected level between 1% and 30%.

14. A biological wastewater treatment process according to claim 13, wherein the oxygen level is selected from one of the group consisting of 1%, 5%, 28% and 30%.

15. A biological wastewater treatment process according to claim 1, wherein the dissolved oxygen level is maintained stable at a selected level between 0.08 mg/L and 2.24 mg/L.

16. A biological wastewater treatment process according to claim 15, wherein the oxygen level is selected from one of the group consisting of 0.08, 0.4, 2.24 and 2.3 mg/L.

17. A biological wastewater treatment process according to claim 1, wherein the substantially stable dissolved oxygen level encourages biomass yield and settleability.

18. A biological wastewater treatment process according to claim 1, wherein the substantially stable dissolved oxygen level encourages growth and/or activity of nitrogen-fixing microorganisms.

19. A biological wastewater treatment process according to claim 18, wherein the activity is nitrogenase enzyme activity.

20. A biological wastewater treatment process according to claim 1, wherein the nitrogen deficient feed is removed from the controlled environment by an outlet after it is at least partially processed.

21. A biological wastewater treatment process according to claim 1, wherein the controlled environment comprises a first controlled environment including nitrogen-fixing organisms, and wherein a second controlled environment is provided that includes non-nitrogen fixing organisms, wherein the process further includes the steps of at least partially processing the nitrogen-deficient feed in the first controlled environment, and then transferring the at least partially processed feed from the first controlled environment to the second controlled environment.

22. A biological wastewater treatment process according to claim 21, wherein the feed is removed from the second controlled environment by an outlet after it is at least partially processed.

23. A biological wastewater treatment process according to claim 1 further including the subsequent treatment of an outflow from the controlled environment through a conventional wastewater treatment plant including non-nitrogen fixing organisms.

24. A biological wastewater treatment process according to claim 1 producing a low soluble nitrogen processed wastewater.

* * * * *